(12) United States Patent
Lih et al.

(10) Patent No.: US 9,537,799 B2
(45) Date of Patent: Jan. 3, 2017

(54) PHASE-BASED PACKET PRIORITIZATION

(71) Applicant: Futurewei Technologies, Inc., Plano, TX (US)

(72) Inventors: Iulin Lih, San Jose, CA (US); Chenghong He, Shenzhen (CN); Hongbo Shi, Xian (CN); Naxin Zhang, Singapore (SG)

(73) Assignee: Futurewei Technologies, Inc., Plano, TX (US)

( * ) Notice: Subject to any disclaimer, the term of this patent is extended or adjusted under 35 U.S.C. 154(b) by 58 days.

(21) Appl. No.: 13/954,210

(22) Filed: Jul. 30, 2013

(65) Prior Publication Data

US 2014/0036929 A1 Feb. 6, 2014

Related U.S. Application Data

(60) Provisional application No. 61/677,734, filed on Jul. 31, 2012, provisional application No. 61/780,453, filed on Mar. 13, 2013.

(51) Int. Cl.
*H04L 12/861* (2013.01)
*H04L 12/833* (2013.01)
*H04L 12/801* (2013.01)

(52) U.S. Cl.
CPC .......... *H04L 49/90* (2013.01); *H04L 47/2458* (2013.01); *H04L 47/10* (2013.01)

(58) Field of Classification Search
CPC ...... H04L 47/10; H04L 49/90; H04L 47/2416; H04L 47/6275; H04L 47/2458

(Continued)

(56) References Cited

U.S. PATENT DOCUMENTS 6,859,435 B1  2/2005  Lee et al.
7,486,681 B2  2/2009  Weber
(Continued)

FOREIGN PATENT DOCUMENTS

EP  1453251 A1  9/2004
EP  1478167 A2  11/2004

OTHER PUBLICATIONS

Foreign Communication From a Counterpart Application, PCT Application No. PCT/US2013/052768, International Search Report dated Oct. 18, 2013, 5 pages.

(Continued)

*Primary Examiner* — Habte Mered
*Assistant Examiner* — Rownak Islam
(74) *Attorney, Agent, or Firm* — Conley Rose, P.C.

(57) ABSTRACT

A network node comprises a receiver configured to receive a first packet, a processor coupled to the receiver and configured to process the first packet, and prioritize the first packet according to a scheme, wherein the scheme assigns priority to packets based on phase, and a transmitter coupled to the processor and configured to transmit the first packet. An apparatus comprises a processor coupled to the memory and configured to generate instructions for a packet prioritization scheme, wherein the scheme assigns priority to packet transactions based on closeness to completion, and a memory coupled to the processor and configured to store the instructions. A method comprises receiving a first packet, processing the first packet, prioritizing the first packet according to a scheme, wherein the scheme assigns priority to packets based on phase, and transmitting the first packet.

12 Claims, 6 Drawing Sheets

|  |  | 575 Priority 1 (Lowest) | 580 Priority 2 | 585 Priority 3 | 590 Priority 4 | 595 Priority 5 (Highest) |
|---|---|---|---|---|---|---|
| 505 | First Transaction | Phase 1 | Phase 2 | Phase 3 | Phase 4 | Phase 5 |
| 510 | Second Transaction | Phase 1 | Phase 2 | Phase 2 or 3 | Phase 3 | Phase 4 |
| 515 | Third Transaction | Phase 1 | Phase 1 or 2 | Phase 2 | Phase 2 or 3 | Phase 3 |
| 520 | Fourth Transaction | Phase 1 | Phase 1 or 2 | Phase 1 or 2 | Phase 1 or 2 | Phase 2 |
| 525 | Fifth Transaction | Phase 1 | Phase 1 | Phase 1 | Phase 1 | Phase 1 |

(58) Field of Classification Search
USPC ............ 370/412, 235, 230.1, 229, 389, 230, 394,370/392, 400, 231
See application file for complete search history.

(56) References Cited

U.S. PATENT DOCUMENTS

| | | | |
|---|---|---|---|
| 2006/0140121 A1 | 6/2006 | Kakani et al. | |
| 2007/0002740 A1* | 1/2007 | Evans | H04L 45/20 370/230.1 |
| 2007/0206621 A1 | 9/2007 | Plamondon et al. | |
| 2011/0258261 A1* | 10/2011 | Levy | H04L 47/12 709/206 |
| 2011/0299400 A1* | 12/2011 | Cohen | H04L 47/17 370/237 |
| 2012/0243413 A1* | 9/2012 | Roullier | 370/235 |
| 2013/0286835 A1* | 10/2013 | Plamondon | H04L 1/1887 370/235 |

OTHER PUBLICATIONS

Foreign Communication From a Counterpart Application, PCT Application No. PCT/US2013/052768, Written Opinion dated Oct. 18, 2013, 8 pages.
Foreign Communication From A Counterpart Application, Chinese Application No. 2013800400116, Chinese Search Report dated Oct. 12, 2016, 2 pages.
Foreign Communication From A Counterpart Application, Chinese Application No. 2013800400116, Chinese Office Action dated Oct. 20, 2016, 8 pages.

\* cited by examiner

PHASE-BASED PACKET PRIORITIZATION

CROSS-REFERENCE TO RELATED APPLICATIONS

This application claims priority to U.S. Provisional Application No. 61/677,734 filed Jul. 31, 2012 by Iulin "Yolin" Lih, et al., and titled "Determining Packet Priority in Packet Transmitting Systems" and claims priority to U.S. Provisional Application No. 61/780,453 filed Mar. 13, 2013 by Iulin "Yolin" Lih, et al., and titled "Determining Packet Priority in Packet Transmitting Systems," which are incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An interconnection network may refer to any system that enables fast data communication among its components, or nodes. An interconnection network may be any switch, router, processor-memory, input/output (I/O), system on a chip (SoC), multiple-chip, or other network. An SoC may refer to a system that integrates all the functionality of a computer or other complex electronic data system onto a single integrated circuit, or chip.

An interconnection network may comprise a plurality of caches. Each cache may comprise a series of address lines where data is stored. Such a network may employ cache coherence, which may refer to a discipline that ensures that a change to data in one cache is propagated throughout the network to other caches sharing the same data. One type of cache coherence is snooping based. Snooping may refer to a process where each cache monitors for access to address lines where it has stored data. If a first cache observes on a second cache a write operation to an address line where the first cache also has stored data, then the first cache may invalidate, or remove, that stored data.

Data in an interconnection network may be exchanged from one node to another node in what is called a transaction. A transaction may comprise phases, which may represent sequential steps toward completion of the transaction. Examples of phases may be a request for data, a transmission of the data, and an acknowledgment of receipt of the data. The data may be exchanged in the form of a packet, which may typically comprise a header containing control information and a payload containing the data that is the purpose of the transmission.

SUMMARY

In one embodiment, the disclosure includes a network node comprising a receiver configured to receive a first packet, a processor coupled to the receiver and configured to process the first packet, and prioritize the first packet according to a scheme, wherein the scheme assigns priority to packets based on phase, and a transmitter coupled to the processor and configured to transmit the first packet.

In another embodiment, the disclosure includes an apparatus comprising a processor coupled to the memory and configured to generate instructions for a packet prioritization scheme, wherein the scheme assigns priority to packet transactions based on closeness to completion, and a memory coupled to the processor and configured to store the instructions.

In yet another embodiment, the disclosure includes a method comprising receiving a first packet, processing the first packet, prioritizing the first packet according to a scheme, wherein the scheme assigns priority to packets based on phase, and transmitting the first packet.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The performance of an interconnection network may be limited by the communication, or interconnection, among its nodes. It is therefore a goal to improve the efficiency of communication, which may determine the ability of the system to deliver data. One metric for measuring efficiency is latency, which may generally refer to the time delay of exchanging data. There are different types of latency. One such type, transaction latency, may refer to the time delay in completing a data transaction. Transaction latency may also be referred to as completion latency or task latency. Packet contention may be one source of transaction latency. Packet contention occurs when packets from different transactions attempt to traverse the same medium at the same time, thus causing a packet traffic bottleneck at that medium. Transaction latency may increase as the number of packets in a medium increases. More broadly, queueing theory may indicate that transaction latency may increase more than linearly with respect to the total number of packets in a network.

Packet prioritization is one method employed to reduce packet contention and thus transaction latency. Packet prioritization may assign priorities to individual packets or transactions. For example, if two packets attempt to traverse the same medium at the same time, then a first packet assigned a higher priority may proceed across the medium before the second packet assigned the lower priority may proceed across the medium. In that way, the assigned prioritization may reduce or eliminate contention between the first packet and the second packet. Previous packet prioritization schemes assigned priority based on the type of the packet (e.g., a movie file versus an image file), the user (e.g., a higher-paying user versus a lower-paying user), the seniority of the transaction (e.g., a transaction that waited more time versus a transaction that waited less time), and packet criticality (e.g., a packet related to operating system functionality versus a packet related to non-essential applications).

Disclosed herein are systems and methods for an improved packet prioritization scheme. The disclosed technique may assign priority based on a transaction's phase and closeness to completion. A transaction with higher priority may leave a medium sooner, choose a more flexible forwarding medium, or both. In assigning such priority, the disclosed technique may shorten transaction latency, reduce the number of incomplete transactions in a network, and reduce bottlenecks. In addition, the reduction in the number of incomplete transactions in a network may allow for reduced buffering space in routing nodes and thus reduced hardware costs.

Figure 1:
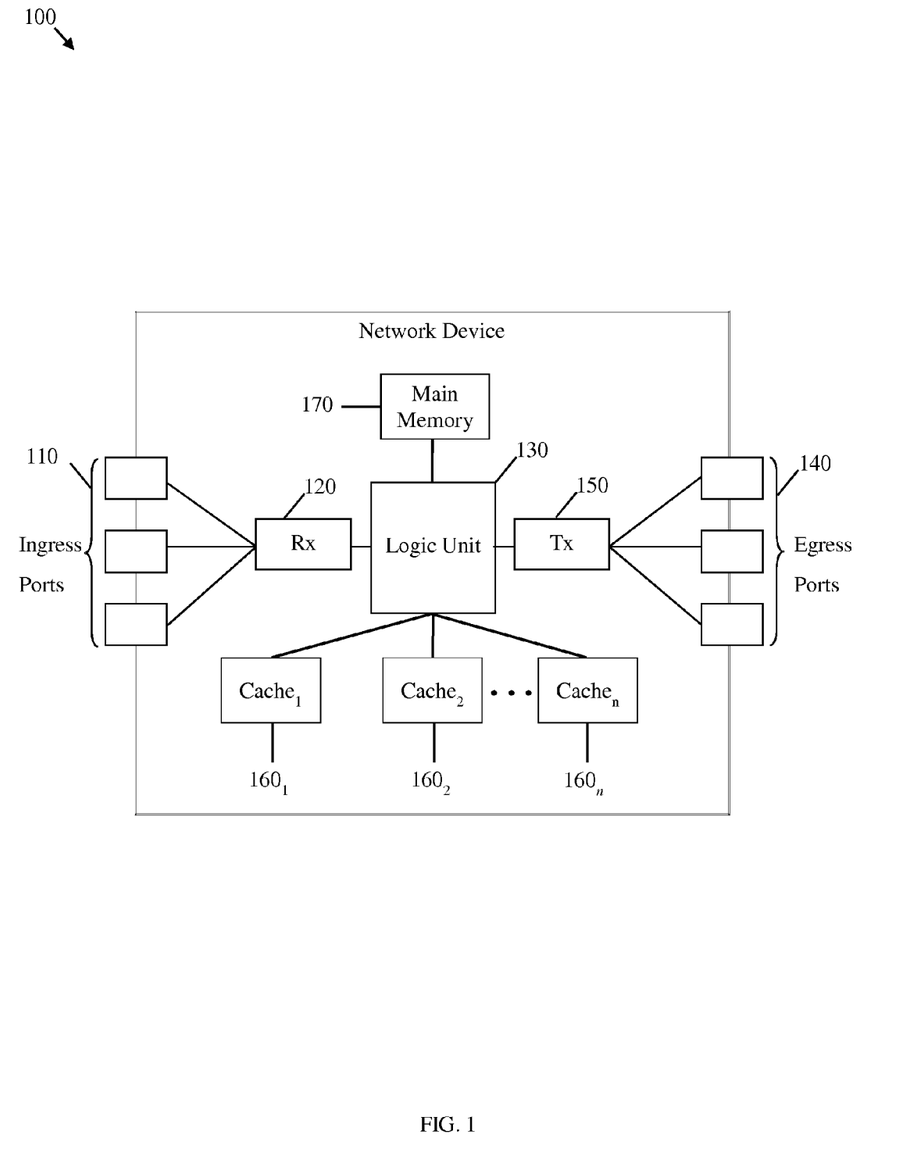
FIG. 1 is a schematic diagram of a network device according to an embodiment of the disclosure.

FIG. 1 is a schematic diagram of a network device 100 according to an embodiment of the disclosure. The device 100 may comprise a plurality of ingress ports 110 and/or receiver units (Rx) 120 for receiving data, a logic unit or processor 130 to process signals, a plurality of egress ports 140 and/or transmitter units (Tx) 150 for transmitting data to other components, a plurality of n caches 160, and a main memory 170. The device 100 may be suitable for implementing any of the disclosed features, methods, and devices.

The logic unit 130, which may be referred to as a central processing unit (CPU), may be in communication with the ingress ports 110, receiver units 120, egress ports 140, transmitter units 150, caches 160, and main memory 170. The logic unit 130 may be implemented as one or more CPU chips, cores (e.g., as a multi-core processor), field-programmable gate arrays (FPGAs), application specific integrated circuits (ASICs), and/or digital signal processors (DSPs), and/or may be part of one or more ASICs.

The caches 160 may be volatile and/or non-volatile and may be read only memory (ROM), random-access memory (RAM), another suitable type of memory, or any combination thereof. As such, the caches 160 may be dedicated chips that are physically or logically connected to the logic unit 130. Alternatively, the caches 160 may be part of a larger logic unit, for example the logic unit 130, and may therefore be more quickly accessed by the logic unit 130. The caches 160 may be hierarchical. For example, the cache $160_1$ may be a first-level cache, the cache $160_2$ may be a second-level cache, and so on. The caches 160 may be smaller and faster than the main memory 170 and may store copies of data from frequently-accessed main memory 170 locations. As a result, the caches 160 may help reduce the latency of data exchange in the device 100 when compared to using the main memory 170 exclusively.

The main memory 170 may be comprised of one or more disks, tape drives, optical disc drives, or solid-state drives; may be used for non-volatile storage of data and as an over-flow data storage device; may be used to store programs when such programs are selected for execution; and may be used to store instructions and perhaps data that are read during program execution. The main memory 170 may be volatile and/or non-volatile and may be ROM, RAM, ternary content-addressable memory (TCAM), static random-access memory (SRAM), another suitable type of memory, or any combination thereof. The main memory 170 may be capable of storing more data than the caches 160. As a result, if, for example, the logic unit 130 cannot access data in one of the caches 160, then the logic unit 130 may attempt to access that data in the main memory 170.

The device 100 is an example of an interconnection network where different nodes, including the logic unit 130, caches 160, and main memory 170, all reside on a single device. As such, the nodes may even be part of an SoC. Alternatively, the nodes may reside on separate chips or devices in any combination forming an interconnection network suitable for implementing any of the disclosed features, methods, and devices. In other words, the disclosed technique is not limited to any specific hardware or software configuration.

Figure 2:
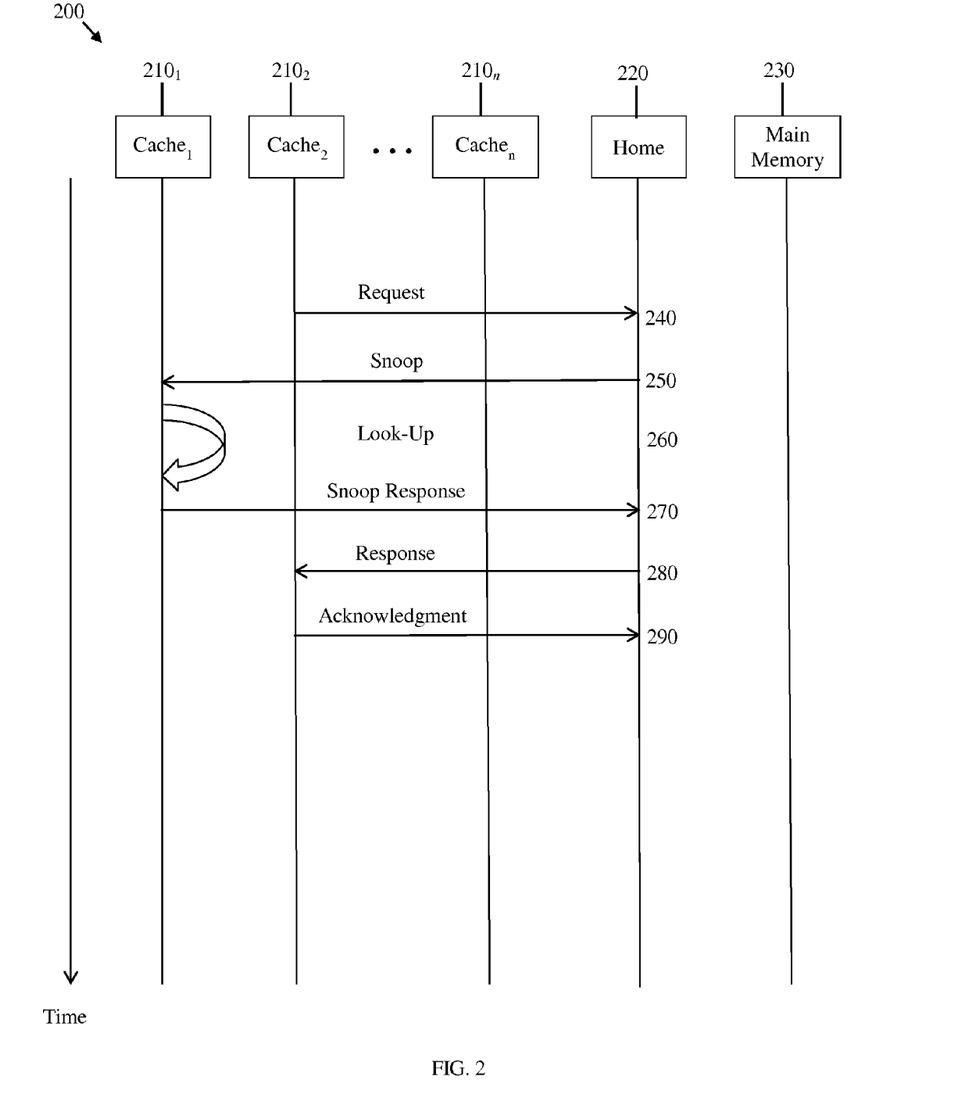
FIG. 2 is a message sequence diagram of an interconnection network for completing a packet transaction.

FIG. 2 is a message sequence diagram of an interconnection network 200 for completing a packet transaction. The network 200 may comprise a plurality of n caches 210, a home 220, and a main memory 230. The caches 210, home 220, and main memory 230 may reside on the device 100. In that case, the caches 210 may correspond to the caches 160, the home 220 may correspond to the logic unit 130, and the main memory 230 may correspond to the main memory 170. It should be understood, however, that the caches 210, home 220, and main memory 230 may be any nodes suitable for implementing the interconnection network 200.

At step 240, the cache $210_2$ may send to the home 220 a request to write to a specific address. At step 250, the home 220 may send to the cache $210_1$ a snoop. The snoop may ask the cache $210_1$ if the cache $210_1$ has data at the same address that the cache $210_2$ wants to write to. At step 260, the cache $210_1$ may perform a look-up at the address. If the cache $210_1$ determines that it has data at the address, then the cache $210_1$ may invalidate that data. If the cache $210_1$ determines that it does not have data at the address, then the cache $210_1$ may not perform any invalidation. At step 270, the cache $210_1$ may send to the home 220 a snoop response. The snoop response may indicate the outcome of the prior look-up by the cache $210_1$. Simultaneously with steps 250-270, the home 220 may send snoops to the remaining caches, $caches_{3-n}$; the $caches_{3-n}$ may perform look-ups; and the $caches_{3-n}$ may send snoop responses to the home 220. At step 280, the home 220 may send to the cache $210_2$ a response. The response may indicate to the cache $210_2$ that the cache $210_2$ may write to the address. At step 290, the cache $210_2$ may send to the home 220 an acknowledgment. The acknowledgment may indicate that the cache $210_2$ received the response at step 270.

Each of the steps 240-250, 270-290 may represent a phase in a packet transaction so that the packet transaction in FIG. 2 may be said to comprise at least five phases. Subsequent phases may relate to processing and forwarding of the associated packet. Because the packet transaction described above comprises a snoop phase and snoop response phase associated with each cache, the packet transaction may be said to demonstrate cache coherence. Some packet transactions may not demonstrate cache coherence. In addition, some packet transactions may not comprise each of the steps 240-290. For example, some packet transactions may not comprise the acknowledgment phase at step 290. Furthermore, some packet transactions may comprise phases in addition to the steps 240-290. The number and types of phases used in a packet transaction may depend on which packet protocol is employed in the network 200.

Figure 3:
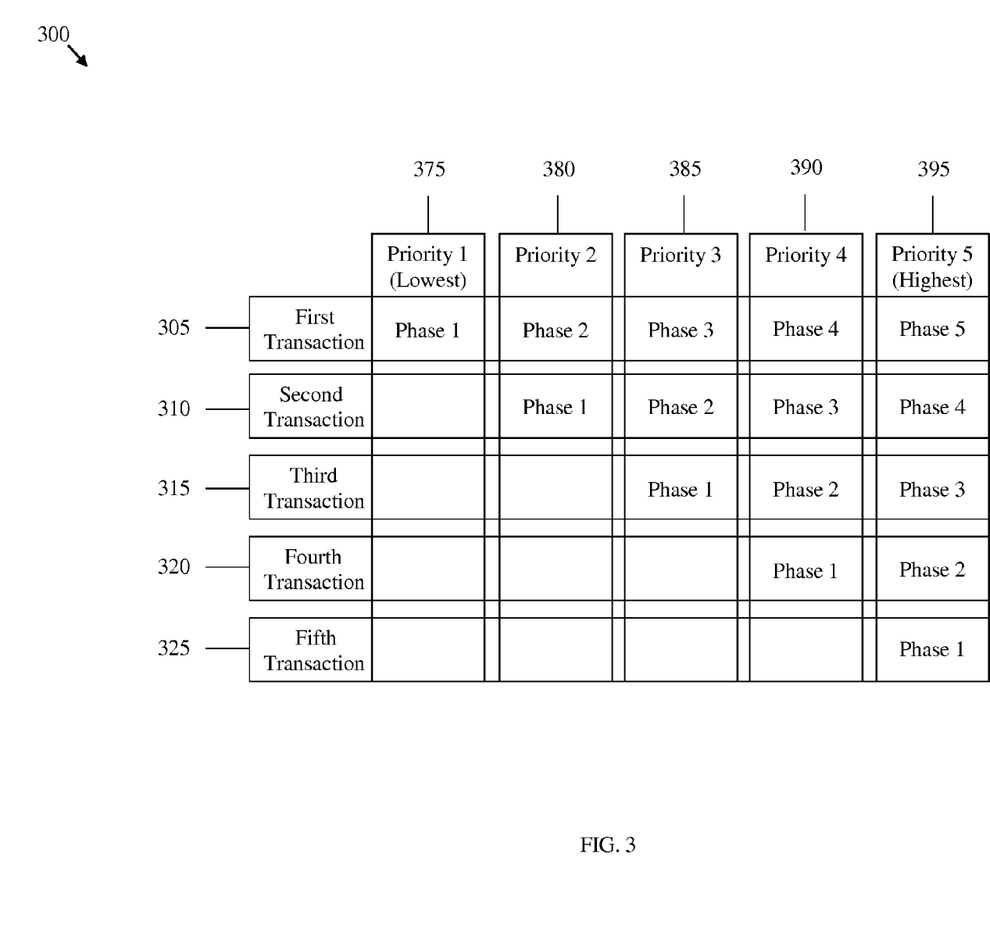
FIG. 3 is a scheme for packet prioritization according to an embodiment of the disclosure.

FIG. 3 is a packet prioritization scheme 300 according to an embodiment of the disclosure. The scheme 300 may contemplate five packet transactions, a first transaction 305, a second transaction 310, a third transaction 315, a fourth transaction 320, and a fifth transaction 325. The first transaction 305 may comprise five phases numbered one through five, the second transaction 310 may comprise four phases numbered one through four, the third transaction 315 may comprise three phases numbered one through three, the fourth transaction 320 may comprise two phases numbered one through two, and the fifth transaction 325 may comprise one phase numbered one.

The scheme 300 may prioritize the transactions so that the last phase of each transaction is given the highest priority, priority 5 395. Accordingly, phase 5 of the first transaction 305, phase 4 of the second transaction 310, phase 3 of the third transaction 315, phase 2 of the fourth transaction 320, and phase 1 of the fifth transaction 325 may all be given priority 5 395. In addition, the scheme 300 may prioritize the transactions so that each phase preceding the last phase is given a sequentially lower priority. For example, phase 5 may be the last phase of the first transaction 305 and may therefore be given the highest priority, priority 5 395; phase 4 may be the first-to-last phase of the first transaction 305 and may therefore be given the first-to-highest priority, priority 4 390; phase 3 may be the second-to-last phase of the first transaction 305 and may therefore be given the second-to-highest priority, priority 3 385; phase 2 may be the third-to-last phase of the first transaction 305 and may therefore be given the third-to-highest priority, priority 2 380; and phase 1 may be the fourth-to-last, or first, phase of the first transaction 305 and may therefore be given the fourth-to-highest, or lowest, priority, priority 1 375.

As can be seen, the scheme 300 may favor transactions that are closer to completion. For example, if the first transaction 305 were in its last phase, phase 5, then it may be given priority 5 395 because it has no more phases to complete. If the second transaction 310 were in its first-to-last phase, phase 3, then it may be given priority 4 390 because it has one more phase to complete. As can also be seen, the scheme 300 may favor transactions with fewer phases. As a first example, the fifth transaction 325 may be given priority 5 395 at any time because it comprises only phase 1. In comparison, the third transaction 315 may be given priority 5 395, priority 4 390, or priority 3 385 depending on which phase it is in. As a second example, if each of the transactions were in phase 1, then the first transaction 305 may be given priority 1 375, the second transaction 310 may be given priority 2 380, the third transaction 315 may be given priority 3 385, the fourth transaction 320 may be given priority 4 390, and the fifth transaction 325 may be given priority 5 395. In other words, the first transaction 305 may need to complete four phases before receiving the same priority as the fifth transaction 325.

Figure 4:
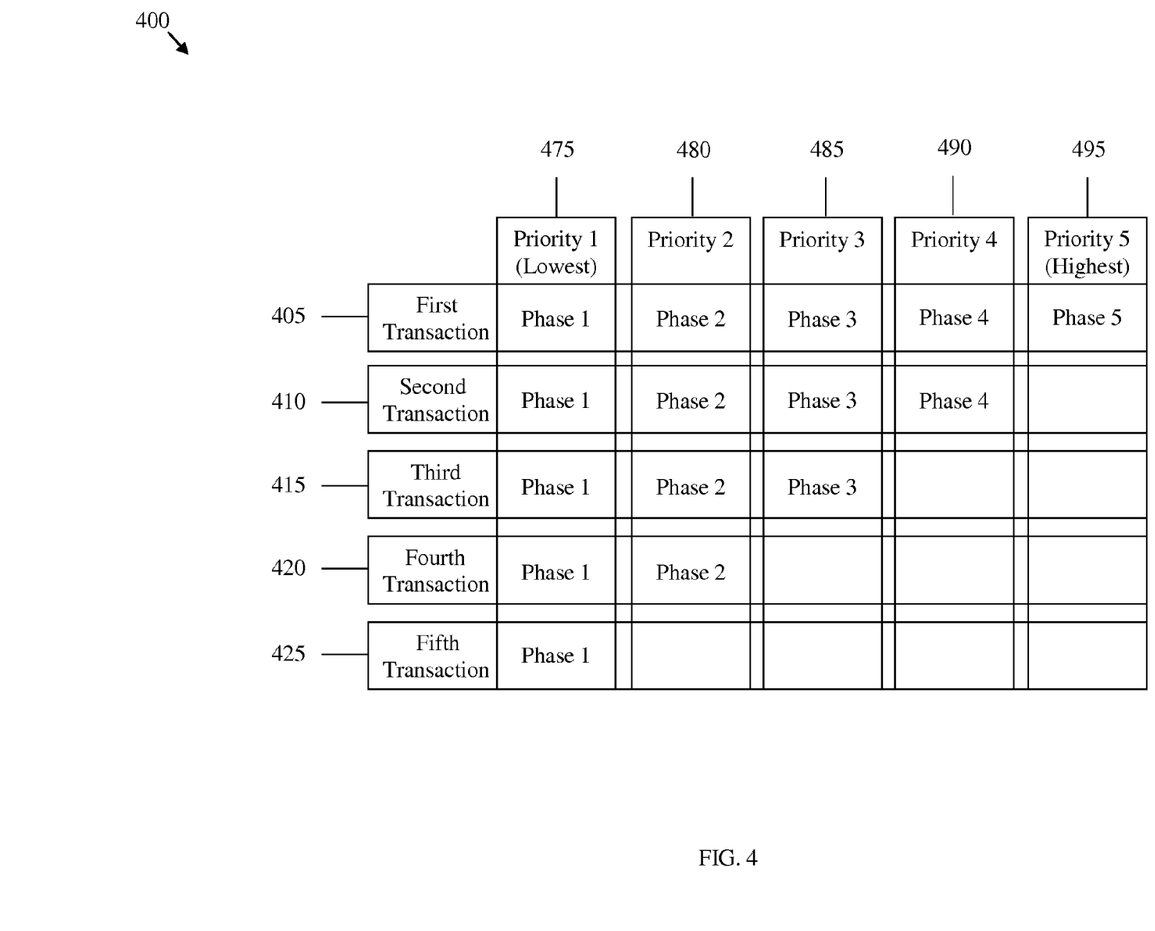
FIG. 4 is a scheme for packet prioritization according to another embodiment of the disclosure.

FIG. 4 is a packet prioritization scheme 400 according to an embodiment of the disclosure. The scheme 400 may contemplate five packet transactions, a first transaction 405, a second transaction 410, a third transaction 415, a fourth transaction 420, and a fifth transaction 425. The first transaction 405 may comprise five phases numbered one through five, the second transaction 410 may comprise four phases numbered one through four, the third transaction 415 may comprise three phases numbered one through three, the fourth transaction 420 may comprise two phases numbered one through two, and the fifth transaction 425 may comprise one phase numbered one.

The scheme may prioritize the transactions so that the first phase of each transaction is given the lowest priority, priority 1 475. Accordingly, phase 1 of the first transaction 405, the second transaction 410, the third transaction 415, the fourth transaction 420, and the fifth transaction 425 may all be given priority 1 475. In addition, the scheme 400 may prioritize the transactions so that each phase succeeding the first phase is given a sequentially higher priority. For example, phase 1 may be the first phase of the first transaction 405 and may therefore be given the lowest priority, priority 1 475; phase 2 may be the second phase of the first transaction 405 and may therefore be given the first-to-lowest priority, priority 2 480; phase 3 may be the third phase of the first transaction 405 and may therefore be given the second-to-lowest priority, priority 3 485; phase 4 may be the fourth phase of the first transaction 405 and may therefore be given the third-to-lowest priority, priority 4 490; and phase 5 may be the fifth phase of the first transaction 405 and may therefore be given the fourth-to-lowest, or highest, priority, priority 5 495.

As can be seen, the scheme 400 may disfavor transactions that are farther from completion. For example, if the first transaction 405 were in its first phase, phase 1, then it may be given priority 1 475 because it has four more phases to complete. If the second transaction 410 were in its second phase, phase 2, then it may be given priority 2 480 because it has two more phases to complete. As can also be seen, the scheme 400 may disfavor transactions with fewer phases. As a first example, the fifth transaction 425 may be given priority 1 475 at any time because it comprises only phase 1. In comparison, the third transaction 415 may be given priority 1 475, priority 2 480, or priority 3 485 depending on which phase it is in. As a second example, if each of the transactions were in their last phase, then the first transaction 405 may be given priority 5 495, the second transaction 410 may be given priority 4 490, the third transaction 415 may be given priority 3 485, the fourth transaction 420 may be given priority 2 480, and the fifth transaction 425 may be given priority 1 475. In other words, the fifth transaction 425 may always be given a higher priority in its last phase even if the other transactions are also in their last phase.

Figure 5:
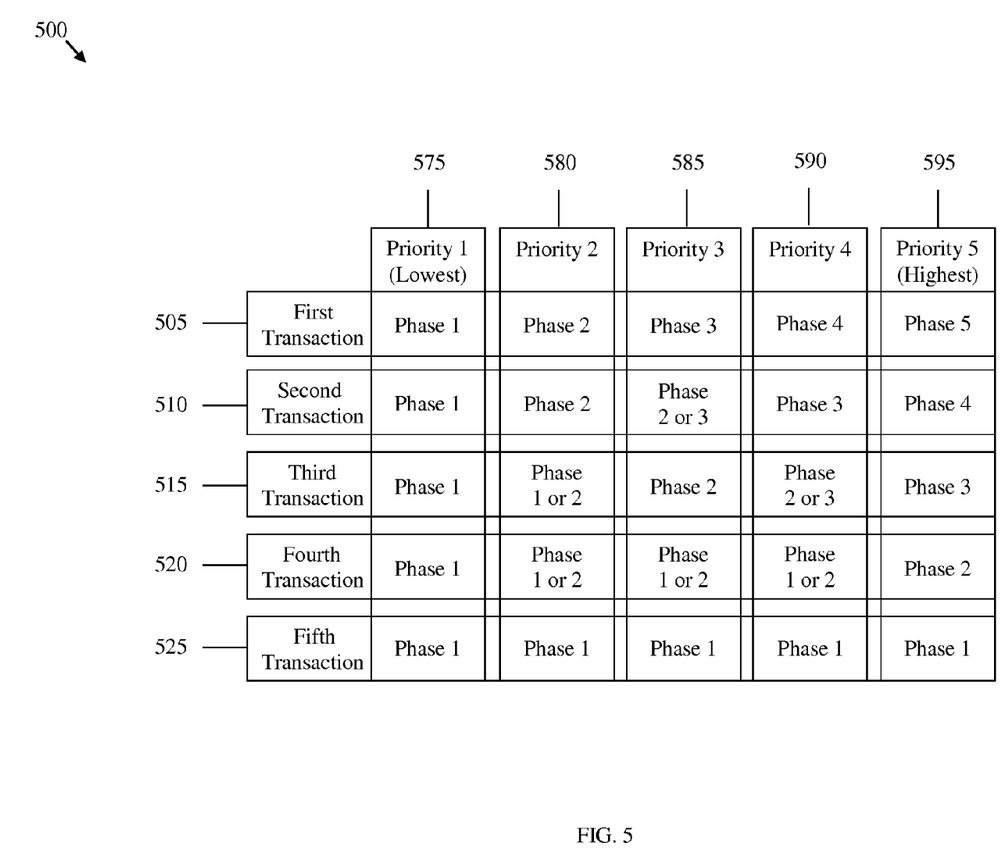
FIG. 5 is a scheme for packet prioritization according to yet another embodiment of the disclosure.

FIG. 5 is a packet prioritization scheme 500 according to an embodiment of the disclosure. The scheme 500 may contemplate five packet transactions, a first transaction 505, a second transaction 510, a third transaction 515, a fourth transaction 520, and a fifth transaction 525. The first transaction 505 may comprise five phases numbered one through five, the second transaction 510 may comprise four phases numbered one through four, the third transaction 515 may comprise three phases numbered one through three, the fourth transaction 520 may comprise two phases numbered one through two, and the fifth transaction 525 may comprise one phase numbered one.

The scheme may prioritize the transactions so that the last phase of each transaction is given the highest priority, priority 5 595, and also so that the first phase of each transaction is given the lowest priority, priority 1 575. Accordingly, phase 5 of the first transaction 505, phase 4 of the second transaction 510, phase 3 of the third transaction 515, phase 2 of the fourth transaction 520, and phase 1 of the fifth transaction 525 may all be given priority 5 595; and phase 1 of the first transaction 505, the second transaction 510, the third transaction 515, the fourth transaction 520, and the fifth transaction 525 may all be given priority 1 575.

The remaining priorities, meaning neither priority 1 575 nor priority 5 595, may be assigned in any sequentially appropriate manner. Accordingly, phase 1 may be the first phase of the third transaction 515 and may therefore be given priority 1 575 or priority 2 580; phase 2 may be the second phase of the third transaction 515 and may therefore be given priority 2 580, priority 3 585, or priority 4 590; and phase 3 may be the third phase of the third transaction 515 and may therefore be given priority 4 590 or priority 5 595.

As can be seen, the scheme 500 may be a combination of the scheme 300 and the scheme 400 and may therefore neither favor nor disfavor transactions that are closer to completion, are farther from completion, have more phases, or have fewer phases. As can also be seen, a phase of a transaction may be assigned multiple priorities. In that case, the phase's ultimate priority may be determined by quality of service (QoS) rules, randomization, or other factors. The QoS rules may relate to assigned throughput, assigned bandwidth, promised latency, a time-stamping algorithm, the type of the packet, the user, the seniority of the transaction, packet criticality, or other factors.

The priorities in the schemes 300, 400, 500 may determine a node's ability to process and forward two contending packets. For example, returning to FIG. 3, if a node is processing both the second transaction 310 and the third transaction 315, the second transaction 310 is in phase 3, and the third transaction 315 is in phase 1, then the second transaction 310 may be given priority 4 390 and the third transaction 315 may be given priority 3 385. Accordingly, if a first packet associated with the second transaction 310 and a second packet associated with the third transaction 315 are contending, then the node may process and forward the first packet before it processes and forwards the second packet. Sometimes the schemes 300, 400, 500 may provide for two transactions to receive the same priority. For example, if a node is processing both the second transaction 310 and the third transaction 315, the second transaction 310 is in phase 3, and the third transaction 315 is in phase 2, then the second transaction 310 may be given priority 4 390 and the third transaction 315 may be given priority 4. In that case, those transactions' priorities may be determined by QoS rules, randomization, or other factors as described above.

The disclosed technique may be used for packet transactions associated with a same source node. For packet transactions from different source nodes, the disclosed technique may be modulated by QoS rules, randomization, or other factors as described above. In addition, the schemes 300, 400, 500 show five transactions comprising one phase to five phases; however, the disclosed technique may be extended for any number of transactions comprising any number of phases. Additionally, when a packet or packet transaction is said to be in a phase, it may be understood that it is in the process of completing the phase or has completed the phase. For example, at step 240, the cache 210₂ may send to the home 220 a request to write to a specific address. The request may represent the first phase of a packet transaction so that the packet transaction is in its first phase when the cache 210₂ generates the request, when the cache 210₂ sends the request, when the home 220 receives the request, or when the home 220 processes the request. After the last phase of the packet transaction, the packet may be processed and forwarded to a next node. Furthermore, the disclosed technique may be applied to any number of nodes on a suitable interconnection or other network. Moreover, the disclosed technique may be applied to packet contention among packets transactions in one node or packet contention among packet transactions in multiple nodes. Finally, the disclosed technique may be applied so that one node may provide instructions for other nodes to prioritize packets, so that each node prioritizes packets independently, in any combination thereof, or in any other suitable manner. For example, a user may implement the disclosed technique via an application, which may provide instructions to any combination of nodes. The instructions may be static or dynamic. A performance monitoring application may be used to dynamically optimize the instructions according to network performance or other factors. The performance monitoring application may be autonomous, be semi-autonomous, or require user input.

Figure 6:
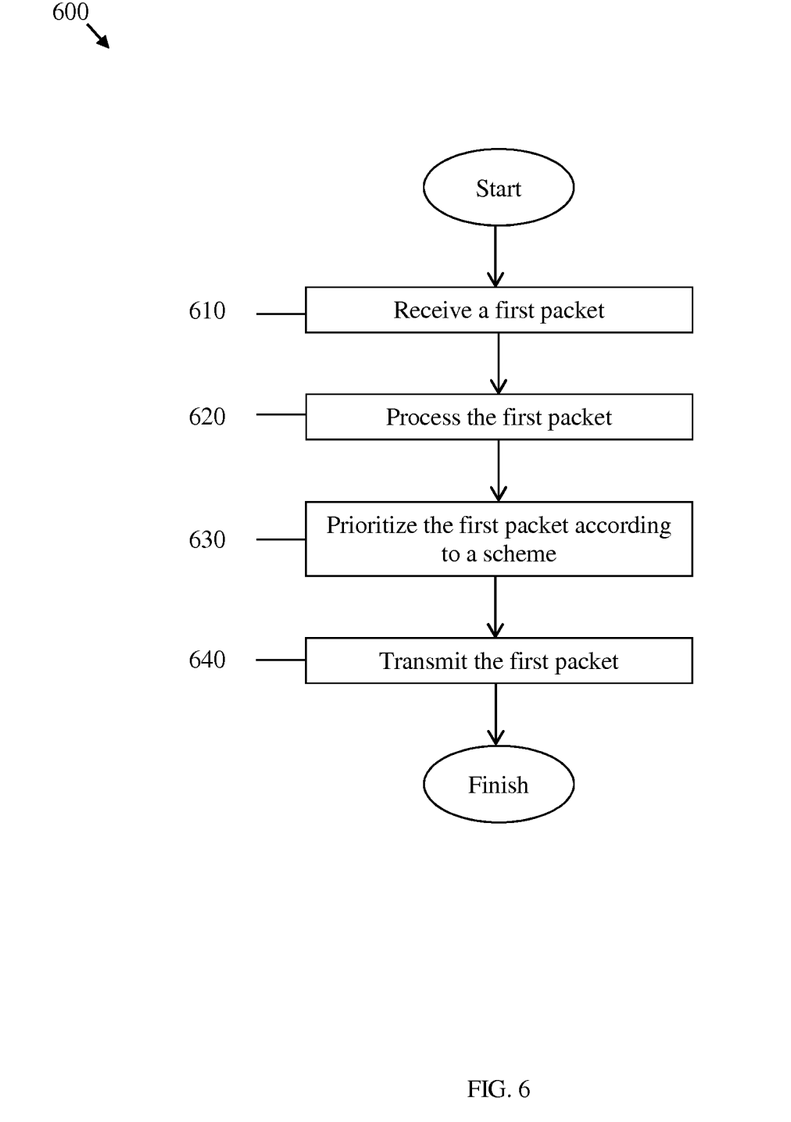
FIG. 6 is a flowchart illustrating a method according to an embodiment of the disclosure.

FIG. 6 is a flowchart illustrating a method 600 according to an embodiment of the disclosure. The method 600 may be implemented in the device 100 or any system comprising a plurality of such devices. At step 610, a first packet may be received. The first packet may be received by any node in an interconnection or other network. The first packet may be received from any other node in an interconnection or other network. At step 620, the first packet may be processed. Processing may comprise parsing a header and payload of the first packet. At step 630, the first packet may be prioritized according to a scheme. The scheme may assign priority to packets based on phase. The scheme may be any of the schemes 300, 400, 500 or any other scheme suitable for implementing the disclosed technique. At step 640, the first packet may be transmitted. The first packet may be transmitted to any other node in an interconnection or other network. The first packet may contend with another packet and be transmitted before or after the other packet based on any of the schemes 300, 400, 500 or any other scheme suitable for implementing the disclosed technique.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network node comprising:
a central processing unit (CPU) configured to receive, from a first cache of the node, a first packet having m transaction phases and a second packet having n transaction phases, wherein m and n are different, and wherein the transaction phases of the first packet and the second packet are sequential steps related to processing and forwarding of the first packet and the second packet,
wherein the CPU is configured to:
process the first packet and the second packet;
determine a total number of transaction phases in the first packet and the second packet; and
assign priority to the first packet and the second packet based on the transaction phase of each packet, wherein a transaction phase closer to transaction completion has a higher priority over transaction phases closer to transaction initiation, wherein highest priority is assigned to packets in their last transaction phase, and wherein a last transaction phase of the first packet has the same priority as a last transaction phase of the second packet; and
a transmitter coupled to the CPU and configured to transmit the first packet and the second packet to a second cache of the node according to the assigned priority in order to reduce latency of the first packet and the second packet.

2. The node of claim 1, wherein the CPU is further configured to assign lowest priority to packets in their first phase.

3. The node of claim 1, wherein the CPU is further configured to assign one of a plurality of intermediate priorities to packets in neither their first phase nor their last phase.

4. The node of claim 1, wherein the assigned priority favors packets that have relatively fewer phases and disfavors packets that have relatively more phases.

5. The node of claim 1, wherein the assigned priority favors packets that have relatively more phases and disfavors packets that have relatively fewer phases.

6. The node of claim 1, wherein the CPU is further configured to assign priority to packets further based on a quality of service (QoS) criterion when the first packet and the second packet generate from different source nodes.

7. The node of claim 1, wherein the assigned priority determines at least one of an ability of the first packet to be sent before the second packet and an ability of the first packet to be sent across a more flexible medium than the second packet.

8. The node of claim 1, wherein phases represent sequential steps toward packet transaction completion.

9. A method comprising:
receiving, at a central processing unit (CPU) from a first cache of a node, a first packet having m transaction phases and a second packet having n transaction phases, wherein m and n are different, and wherein the transaction phases of the first packet and the second packet are sequential steps related to processing and forwarding of the first packet and the second packet;
processing, by the CPU, the first packet and the second packet;
determining, by the CPU, a total number of transaction phases in the first packet and the second packet;
assigning, by the CPU, priority to the first packet and the second packet based on the transaction phase of each packet, wherein a transaction phase closer to transaction completion has a higher priority over transaction phases closer to transaction initiation, wherein highest priority is assigned to packets in their last transaction phase, and wherein a last transaction phase of the first packet has the same priority as a last transaction phase of the second packet; and
transmitting, by a transmitter of the node, the first packet and the second packet to a second cache of the node according to the assigned priority in order to reduce latency of the first packet and the second packet.

10. The method of claim 9, wherein the CPU assigns relatively lower priority to packets in their earlier phases.

11. The method of claim 9, wherein the CPU assigns one of a plurality of intermediate priorities to packets in neither their first phase nor their last phase.

12. The method of claim 9, wherein the assigned priority determines at least one of an ability of the first packet to be sent before the second packet and an ability of the first packet to be sent across a more flexible medium than the second packet.

* * * * *